US010133679B2

(12) United States Patent
Chai et al.

(10) Patent No.: US 10,133,679 B2
(45) Date of Patent: Nov. 20, 2018

(54) READ CACHE MANAGEMENT METHOD AND APPARATUS BASED ON SOLID STATE DRIVE

(71) Applicant: HUAWEI TECHNOLOGIES CO., LTD., Shenzhen, Guangdong (CN)

(72) Inventors: Yunpeng Chai, Beijing (CN); Dongwang Sun, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/637,241

(22) Filed: Jun. 29, 2017

(65) Prior Publication Data
US 2017/0300426 A1    Oct. 19, 2017

Related U.S. Application Data

(63) Continuation of application No. PCT/CN2015/098670, filed on Dec. 24, 2015.

(30) Foreign Application Priority Data

Dec. 30, 2014 (CN) .......................... 2014 1 0844432

(51) Int. Cl.
G06F 12/02 (2006.01)
G06F 12/126 (2016.01)
(Continued)

(52) U.S. Cl.
CPC ............ *G06F 12/126* (2013.01); *G06F 12/06* (2013.01); *G06F 12/0684* (2013.01);
(Continued)

(58) Field of Classification Search
None
See application file for complete search history.

(56) References Cited

U.S. PATENT DOCUMENTS

2009/0210620 A1* 8/2009 Jibbe ..................... G06F 11/108
711/114
2010/0211731 A1  8/2010 Mittendorff et al.
(Continued)

FOREIGN PATENT DOCUMENTS

CN   102945207    2/2013
CN   103645859    3/2014
(Continued)

OTHER PUBLICATIONS

International Search Report dated Feb. 29, 2016 in corresponding International Application No. PCT/CN2015/098670.
(Continued)

*Primary Examiner* — Brian R Peugh
(74) *Attorney, Agent, or Firm* — Staas & Halsey LLP

(57) ABSTRACT

A read cache management method and apparatus based on a solid state drive, and the method includes: determining whether a read request hits a first queue and a second queue (S101); if both the first queue and the second queue are missed, selecting and deleting an eliminated data block from the first queue (S102); if the eliminated data block is in a stored state, inserting the eliminated data block into the second queue (S103); and determining a target data block in a lower-level storage medium, and inserting the target data block into the first queue, (S104). According to the foregoing read cache management method and apparatus based on the solid state drive, a hit ratio of the solid state drive can be increased, a data write count of the solid state drive can be reduced, and service life of the solid state drive can be extended.

14 Claims, 5 Drawing Sheets

(51) Int. Cl.
    *G06F 12/06*         (2006.01)
    *G06F 12/0804*     (2016.01)
    *G06F 12/0871*     (2016.01)

(52) U.S. Cl.
    CPC ...... *G06F 12/0804* (2013.01); *G06F 12/0871* (2013.01); *G06F 12/0246* (2013.01)

(56) References Cited

U.S. PATENT DOCUMENTS

| | | |
|---|---|---|
| 2011/0138106 A1 | 6/2011 | Prabhakaran et al. |
| 2011/0238908 A1 | 9/2011 | Kurita |
| 2013/0145085 A1 | 6/2013 | Yu et al. |
| 2017/0206161 A1* | 7/2017 | Feldman .......... G11B 20/10527 |
| 2017/0300426 A1* | 10/2017 | Chai ....................... G06F 12/06 |

FOREIGN PATENT DOCUMENTS

| | | |
|---|---|---|
| CN | 103885728 | 6/2014 |
| CN | 104090852 | 10/2014 |
| CN | 104572491 | 4/2015 |
| WO | WO2013151948 | 10/2013 |

OTHER PUBLICATIONS

International Search Report, dated Feb. 29, 2016, in International Application No. PCT/CN2015/098670 (5 pp.).
Search Report, dated Apr. 10, 2017, in Chinese Application No. 201410844432.0 (2 pp.).
Office Action, dated Apr. 19, 2017, in Chinese Application No. 201410844432.0 (3 pp.).

\* cited by examiner

10,133,679 B2

READ CACHE MANAGEMENT METHOD AND APPARATUS BASED ON SOLID STATE DRIVE

CROSS-REFERENCE TO RELATED APPLICATIONS

This application is a continuation of International Application No. PCT/CN2015/098670, filed on Dec. 24, 2015, which claims priority to Chinese Patent Application No. 201410844432.0, filed on Dec. 30, 2014. The disclosures of the aforementioned applications are hereby incorporated by reference in their entireties.

TECHNICAL FIELD

The present disclosure relates to the computer field, and in particular, to a read cache management method and apparatus based on a solid state drive.

BACKGROUND

Currently, to improve input/output performance of a disk system, for example, to reduce a request response time and increase a throughput rate, in most storage systems, a cache technology is used at an upper layer of the disk system to meet a performance improvement requirement.

In a conventional storage system, a database system generally uses a DRAM (Dynamic Random Access Memory) as a cache medium. The DRAM has advantages of read/write balance and write durability. There is no need to consider a write count of the DRAM, and data can be frequently written into the DRAM.

To reduce a cost of a cache medium, increasing storage systems use an SSD (Solid State Drive) as the cache medium. The SSD has advantages of a greater capacity, a lower cost, and non-volatility. However, the SSD has a limited erase count. When the SSD is managed by using a conventional cache replacement algorithm (such as an LRU), because the cache medium lacks a drive data update, a miss of a new read request causes a data block in the SSD to be deleted. If new read requests are constantly missed, data blocks in the SSD are constantly kicked out, and a retention time of data blocks in the SSD is extremely short. However, these kicked-out data blocks may be rewritten into the SSD after a specific period of time. Consequently, frequent data erase operations can reduce service life of the SSD and increase a cost and maintenance difficulty.

SUMMARY

To resolve a technical problem, embodiments of the present disclosure provide a read cache management method and apparatus based on an SSD, so as to reduce an erase count of the SSD and extend service life of the SSD.

To resolve the foregoing technical problem, a first aspect of the embodiments of the present disclosure provides a read cache management method based on an SSD, including:

receiving a read request, and determining whether the read request hits a first queue and a second queue;

if both the first queue and the second queue are missed, selecting and deleting an eliminated data block from the first queue according to a cache replacement algorithm, where the eliminated data block is in a stored state;

if the eliminated data block is in the stored state, inserting the eliminated data block into the second queue; and determining a target data block corresponding to the read request in a lower-level storage medium, and inserting the target data block into the first queue, where the target data block is in a non-stored state.

With reference to the first aspect, in a first possible implementation manner, the method further includes:

if the eliminated data block is in the non-stored state, deleting the eliminated data block from the first queue, and deleting the eliminated data block from the SSD.

With reference to the first aspect, in a second possible implementation manner, the method further includes:

if the read request misses the first queue, but hits the second queue, deleting, from the second queue, a hit data block corresponding to the read request; and inserting the hit data block into the first queue.

With reference to the first or the second possible implementation manner of the first aspect, in a third possible implementation manner, the method further includes:

calculating an idle time of a to-be-processed data block in the second queue, where the to-be-processed data block is any one of data blocks in the second queue;

when non-accessed duration of the to-be-processed data block is greater than the idle time of the to-be-processed data block, deleting the to-be-processed data block from the second queue; and obtaining an identity of the to-be-processed data block, and inserting the identity of the to-be-processed data block into a third queue.

With reference to the third possible implementation manner of the first aspect, in a fourth possible implementation manner, the calculating an idle time of a to-be-processed data block in the second queue includes:

collecting statistics on hit count M of the to-be-processed data block in the first queue and hit count N of the to-be-processed data block in the second queue; and calculating the idle time of the to-be-processed data block according to the hit count M and the hit count N.

With reference to the second possible implementation manner of the first aspect, in a fifth possible implementation manner, the inserting the eliminated data block into the second queue includes:

obtaining identity information of the eliminated data block; and if the identity information of the eliminated data block is not in a third queue, inserting the eliminated data block into the second queue; or if the identity information of the eliminated data block is in the third queue, determining whether elimination duration of the eliminated data block is greater than a preset time threshold; and if the elimination duration of the eliminated data block is greater than the preset time threshold, inserting the eliminated data block into the second queue.

With reference to the first aspect, or any one of the first to the fifth possible implementation manners of the first aspect, in a sixth possible implementation manner, after the deleting the to-be-processed data block from the second queue when non-accessed duration of the to-be-processed data block is greater than the idle time of the to-be-processed data block, the method further includes:

searching the first queue for the first data block in the non-stored state; and writing the first data block in the non-stored state into the SSD, and setting the data block to the stored state after a write operation is completed; or determining the first K data blocks that are in the non-stored state and that are in the first queue, where K is an integer greater than 0; and writing a data block that has a maximum access count and that is in the K data blocks into the SSD, and setting the data block that has the maximum access count to the stored state after a write operation is completed.

Correspondingly, a second aspect of the embodiments of the present disclosure further provides a read cache management apparatus based on an SSD, where the SSD includes a first queue and a second queue, and the apparatus includes:

a judging module, configured to: receive a read request, and determine whether the read request hits the first queue and the second queue;

a first deletion module, configured to: if both the first queue and the second queue are missed, select and delete an eliminated data block from the first queue according to a cache replacement algorithm;

a first insertion module, configured to: if the eliminated data block is in a stored state, insert the eliminated data block into the second queue; and a determining module, configured to: determine a target data block corresponding to the read request in a lower-level storage medium, and insert the target data block into the first queue, where the target data block is in a non-stored state.

With reference to the second aspect, in a first possible implementation manner, the apparatus further includes:

a second deletion module, configured to: if the eliminated data block is in the non-stored state, delete the eliminated data block from the first queue, and delete the eliminated data block from the SSD.

With reference to the first possible implementation manner of the second aspect, in a second possible implementation manner, the apparatus further includes:

a third deletion module, configured to: if the read request misses the first queue, but hits the second queue, delete, from the second queue, a hit data block corresponding to the read request; and a second insertion module, configured to insert the hit data block into the first queue.

With reference to the first or the second possible implementation manner of the second aspect, in a third possible implementation manner, the apparatus further includes:

a calculation module, configured to calculate an idle time of a to-be-processed data block in the second queue, where the to-be-processed data block is any one of data blocks in the second queue;

a fourth deletion module, configured to: when non-accessed duration of the to-be-processed data block is greater than the idle time of the to-be-processed data block, delete the to-be-processed data block from the second queue; and a third insertion module, configured to: obtain an identity of the to-be-processed data block, and insert the identity of the to-be-processed data block into a third queue.

With reference to the third possible implementation manner of the second aspect, in a fourth possible implementation manner, the calculation module includes:

a statistics collecting unit, configured to collect statistics on hit count M of the to-be-processed data block in the first queue and hit count N of the to-be-processed data block in the second queue; and a calculation unit, configured to calculate the idle time of the to-be-processed data block according to the hit count M and the hit count N.

With reference to the second possible implementation manner of the second aspect, in a fifth possible implementation manner, the first insertion module is configured to: obtain identity information of the eliminated data block; and if the identity information of the eliminated data block is not in a third queue, insert the eliminated data block into the second queue; or if the identity information of the eliminated data block is in the third queue, determine whether elimination duration of the eliminated data block is greater than a preset time threshold; and if the elimination duration of the eliminated data block is greater than the preset time threshold, insert the eliminated data block into the second queue.

With reference to the second aspect, or any one of the first to the fifth possible implementation manners of the second aspect, in a sixth possible implementation manner, the apparatus further includes:

a write module, configured to: search the first queue for the first data block in the non-stored state; and write the first data block in the non-stored state into the SSD, and set the data block to the stored state after a write operation is completed; or determine the first K data blocks that are in the non-stored state and that are in the first queue, where K is an integer greater than 0; and write a data block that has a maximum access count and that is in the K data blocks into the SSD, and set the data block that has the maximum access count to the stored state after write operation is completed.

Implementation of the embodiments of the present disclosure brings about the following beneficial effects:

Considering a limited erase count of an SSD, based on an existing cache replacement algorithm, a data block eliminated from a first queue is inserted into a set second queue instead of being directly deleted from the SSD, and therefore a retention time of the eliminated data block in the SSD is increased, so as to increase a read hit ratio of the SSD. In addition, when the SSD is missed, metadata is written into the first queue, so that a write count of the SSD can be reduced, and service life of the SSD can be extended.

BRIEF DESCRIPTION OF DRAWINGS

To describe the technical solutions in the embodiments of the present disclosure more clearly, the following briefly describes the accompanying drawings required for describing the embodiments. disclosure.

DESCRIPTION OF EMBODIMENTS

Figure 1:
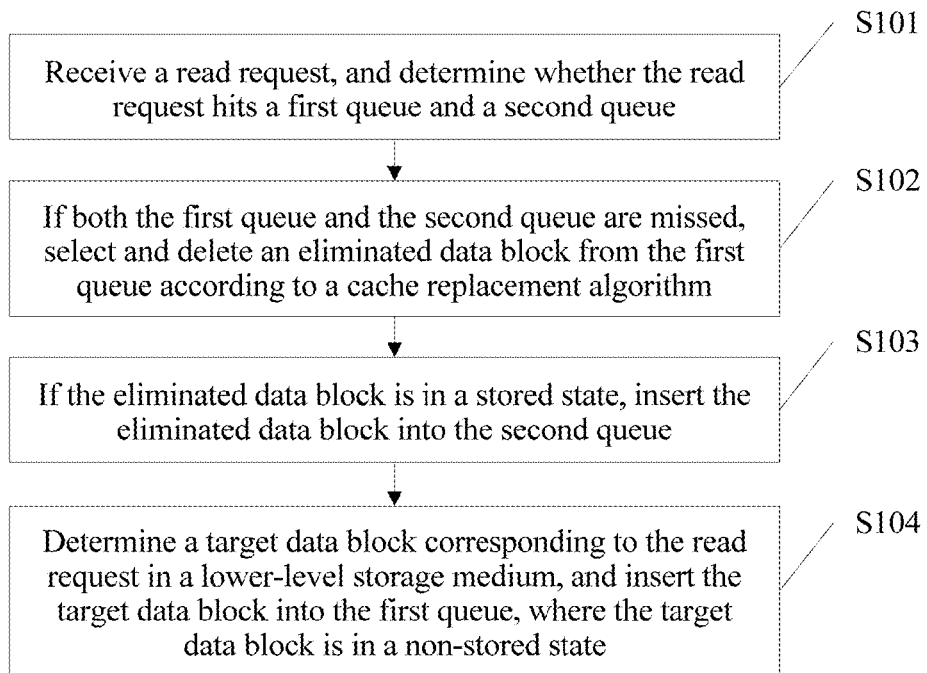
FIG. 1 is a schematic flowchart of a read cache management method based on an SSD according to an embodiment of the present disclosure.

The following clearly describes the technical solutions in the embodiments of the present disclosure with reference to the accompanying drawings in the embodiments of the present disclosure. disclosure disclosure disclosure Referring to FIG. 1, FIG. 1 is a schematic flowchart of a read cache management method based on an SSD according to an embodiment of the present disclosure. In this embodiment of the present disclosure, the method includes the following steps.

S101. Receive a read request, and determine whether the read request hits a first queue and a second queue.

An SSD (Solid State Driver) is used as a cache of a lower-level storage medium, and the lower-level storage medium may be a mechanical hard disk drive HDD. An access rate of the HDD is less than that of the SSD, but a cost per byte of the HDD is lower than that of the SSD. The SSD includes the first queue and the second queue. The first queue includes at least one data block, and the data block is a copy or a metadata copy that is of a data block in the lower-level storage medium. That is, the data block in the first queue may be in a stored state or a non-stored state. The stored state indicates that data stored in the data block in the first queue is a copy of data stored in the data block in the lower-level storage medium, and the data stored in the data block in the lower-level storage medium is actually stored in the SSD. The non-stored state indicates that the data stored in the data block in the first queue is metadata of the data stored in the data block in the lower-level storage medium, and the data in the data block in the lower-level storage medium is not actually stored in the SSD. It may be understood that a size of the metadata of the data is less than a size of the data.

The second queue stores a data block that is eliminated from the first queue according to a preset cache replacement algorithm, and the eliminated data block in the second queue is a data block in the stored state. A read cache management apparatus receives the read request. The read request may be sent by a higher-level cache medium of the SSD, such as a DRAM or a main memory, and the read request carries a logical address. The read cache management apparatus determines, according to the logical address, whether a data block corresponding to the logical address exists in the first queue or the second queue. If the data block corresponding to the logical address exists in the first queue or the second queue, it indicates that the read request hits the first queue or the second queue, or if no data block corresponding to the logical address exists in the first queue or the second queue, it indicates that the read request misses the first queue and the second queue.

It should be noted that a scenario used in this embodiment of the present disclosure is as follows: After the SSD runs for a period of time, the first queue included in the SSD is in a full state.

S102. If both the first queue and the second queue are missed, select and delete an eliminated data block from the first queue according to a cache replacement algorithm.

If both the first queue and the second queue are missed, the read cache management apparatus needs to determine a data block corresponding to the read request in a lower-level storage medium, and inserts the data block into the first queue. If the first queue is a full queue, before an insertion operation, one data block needs to be deleted from the first queue. A specific data block to be deleted from the first queue may be selected by using the cache replacement algorithm such as an LRU, an LIRS, or an ARC in the prior art, and the present disclosure imposes no limitation. If the read cache management apparatus selects a data block from the first queue, and the data block in the stored state is referred to as an eliminated data block in this embodiment of the present disclosure, the read cache management apparatus deletes the selected eliminated data block. If the eliminated data block is in the stored state, S103 is performed; or if the eliminated data block selected by the read cache management apparatus is in the non-stored state, the eliminated data block is deleted from the first queue and deleted from the SSD.

S103. If the eliminated data block is in a stored state, insert the eliminated data block into the second queue.

The read cache management apparatus inserts the eliminated data block in the stored state into the second queue. The eliminated data block deleted from the first queue enters the second queue instead of being deleted from the SSD, and the data blocks in the second queue are in the stored state.

S104. Determine a target data block corresponding to the read request in a lower-level storage medium, and insert the target data block into the first queue, where the target data block is in a non-stored state.

The read cache management apparatus directly performs a read operation on the target data block in the lower-level storage medium according to the read request, and returns data in the target data block to an object that sends the read request. After the read operation is completed, the read cache management apparatus generates the target data block in the non-stored state by using metadata of the data in the target data block corresponding to the read request, and the read cache management apparatus inserts the target data block in the non-stored state into the first queue.

During implementation of this embodiment of the present disclosure, considering a limited erase count of an SSD, based on an existing cache replacement algorithm, a data block eliminated from a first queue is inserted into a set second queue instead of being directly deleted from the SSD, and therefore a retention time of the eliminated data block in the SSD is increased, so as to increase a read hit ratio of the SSD. In addition, when the SSD is missed, metadata is written into the first queue, so that a write count of the SSD can be reduced, and service life of the SSD can be extended.

Optionally, in some embodiments of the present disclosure, the method further includes:

if the read request misses the first queue, but hits the second queue, deleting, from the second queue, a hit data block corresponding to the read request; and inserting the hit data block into the first queue.

If the read request misses the first queue, but hits the second queue, a data block corresponding to the read request is deleted from the second queue is deleted, where the data block corresponding to the read request is referred to as a hit data block in this embodiment of the present disclosure. The read cache management apparatus inserts the hit data block into the first queue. If the first queue is not full, the hit data block is directly inserted into the first queue; or if the first queue is full, one data block is deleted from the first queue according to a preset cache replacement algorithm, and after a deletion operation is completed, the hit data block is inserted into the first queue again.

It should be noted that if the data block deleted from the first queue is in the stored state, the deleted data block still needs to be inserted into the second queue.

Optionally, in some embodiments of the present disclosure, the method further includes:

calculating an idle time of a to-be-processed data block in the second queue, where the to-be-processed data block is any one of data blocks in the second queue;

when non-accessed duration of the to-be-processed data block is greater than the idle time of the to-be-processed data block, deleting the to-be-processed data block from the second queue; and obtaining an identity of the to-be-processed data block, and inserting the identity of the to-be-processed data block into a third queue.

A length of the second queue is limited. If the data block in the second queue is not accessed for a long time, an unpopular data block needs to be eliminated, so that a popular data block can enter the SSD. Elimination of the data block in the second queue may be based on the idle time. When the non-accessed duration of the data block is greater than the idle time of the data block, the data block is deleted from the second queue and deleted from the SSD. The read cache management apparatus obtains the identity of the deleted data block, and inserts the identity into the third queue. The third queue is a queue that has a specific length, and may be a FIFO queue. The read cache management apparatus inserts the identity of the deleted data block into a tail of the third queue.

Optionally, in some embodiments of the present disclosure, the calculating an idle time of a to-be-processed data block in the second queue includes:

collecting statistics on hit count M of the to-be-processed data block in the first queue and hit count N of the to-be-processed data block in the second queue; and calculating the idle time of the to-be-processed data block according to the hit count M and the hit count N.

The read cache management apparatus classifies data blocks in the second queue into three types, which are respectively: a strange block, a common block, and a good block. Different attributes of the data blocks are corresponding to different idle times. In this embodiment of the present disclosure, a method for calculating a data block is as follows:

Good block: A hit count of the data block in the first queue is M, and a hit count of the data block in the second queue is N. If M=T*N, and T is a constant greater than 1, it indicates that the data block is very popular, and the data block is referred to as the good block. The good block is often located in the first queue, and the idle time that is of the good block and that is set in the second queue is relatively long. If a reference idle time is I, the idle time of the good block is G1*I, where G1 is a constant greater than 1.

Common block: If the common block is a data block that meets M<T*N, it indicates that the common block often appears in the second queue, and can be returned to the first queue after being hit. The idle time of the common block is set to G2*I, where G2<G1.

Strange block: The strange block is a new data block that enters the first queue, a hit count in the first queue is 1, and the idle time is set to the reference idle time I.

Optionally, in some embodiments of the present disclosure, the inserting the eliminated data block into the second queue includes:

obtaining identity information of the eliminated data block; and if the identity information of the eliminated data block is not in a third queue, inserting the eliminated data block into the second queue; or if the identity information of the eliminated data block is in the third queue, determining whether elimination duration of the eliminated data block is greater than a preset time threshold; and if the elimination duration of the eliminated data block is greater than the preset time threshold, inserting the eliminated data block into the second queue.

The data block that is corresponding to the identity and that is in the third queue cannot enter the second queue within preset duration. When a data block needs to be eliminated from the first queue, the read cache management apparatus obtains an identity of the data block, and determines whether the identity is in the third queue. If the identity is in the third queue, the read cache management apparatus calculates duration between a current moment and a moment at which the data block is last eliminated. If the calculated duration is greater than the preset time threshold, the eliminated data block is inserted into the second queue; or if the calculated duration is not greater than the preset time threshold, the eliminated data block is deleted from the first queue and deleted from the SSD instead of entering the second queue.

If the identity of the eliminated data block is not in the third queue, the data block is inserted into the second queue.

Optionally, in some embodiments of the present disclosure, after the deleting the to-be-processed data block from the second queue when non-accessed duration of the to-be-processed data block is greater than the idle time of the to-be-processed data block, the method further includes:

searching the first queue for the first data block in the non-stored state; and writing the first data block in the non-stored state into the SSD, and setting the data block to the stored state after a write operation is completed; or determining the first K data blocks that are in the non-stored state and that are in the first queue, where K is an integer greater than 0; and writing a data block that has a maximum access count and that is in the K data blocks into the SSD, and setting the data block that has the maximum access count to the stored state after a write operation is completed.

After the data block is deleted from the second queue, the read cache management apparatus needs to load data from the lower-level storage medium and write the data into the data block in the SSD. A cache update policy may be as follows:

That the read cache management apparatus searches the first queue for a data block in the non-stored state, and writes the data block in the non-stored state into the SSD means that the read cache management apparatus writes, according to the metadata in the data block, the data that is corresponding to the metadata and that is in the lower-level storage medium into the data block, and sets the data block to the stored state after the write operation is completed.

Alternatively, the read cache management apparatus obtains, according to an access count, the K data blocks that are in the non-stored state and that are in the first queue, writes the data block that has the maximum access count and that is in the K data blocks into the SSD, and sets the data block that has the maximum access count to the stored state after the write operation is completed.

Figure 2A:
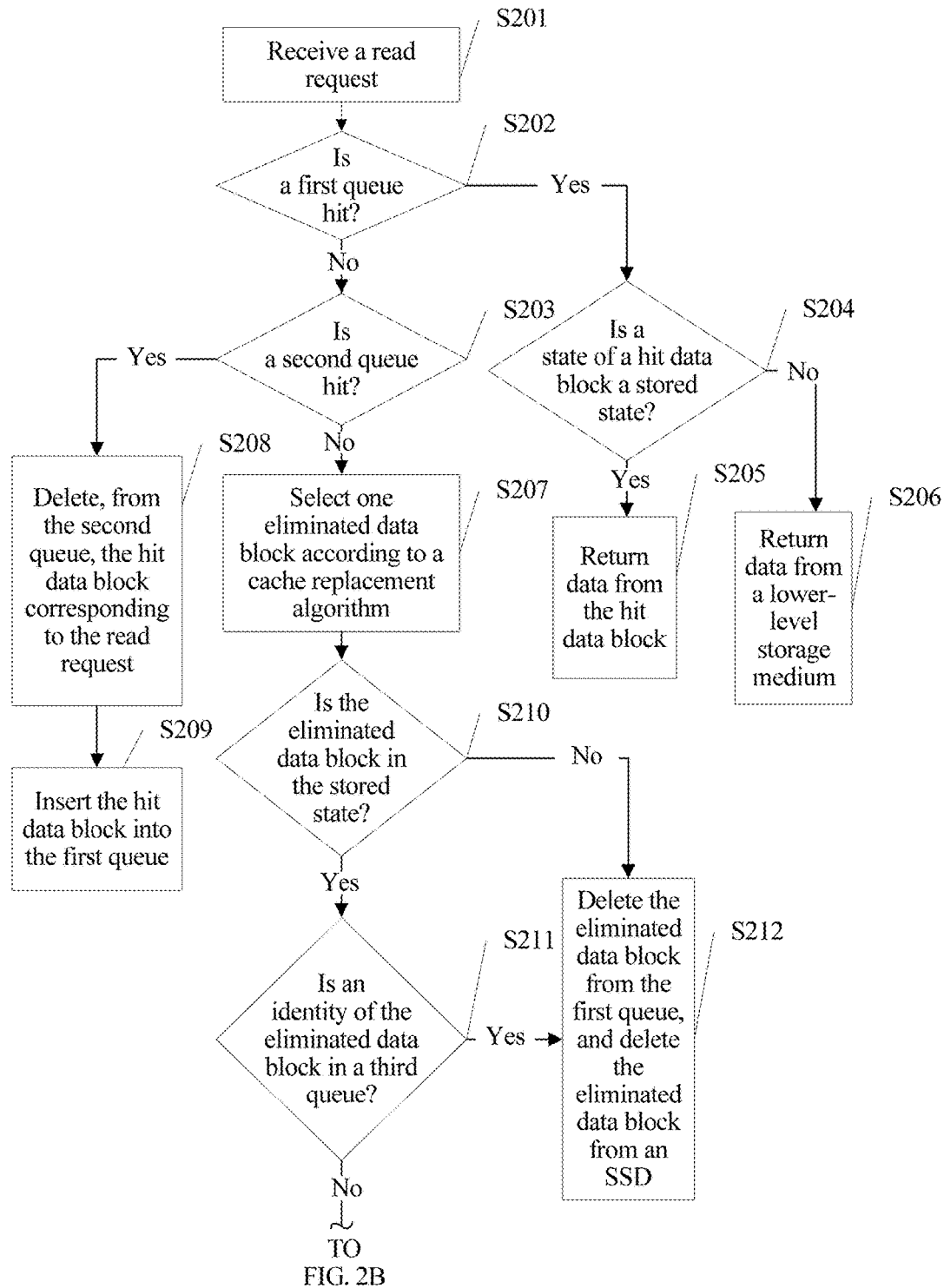
FIG. 2A to FIG. 2B are another schematic flowchart of a read cache management method based on an SSD according to an embodiment of the present disclosure.
Figure 2B:
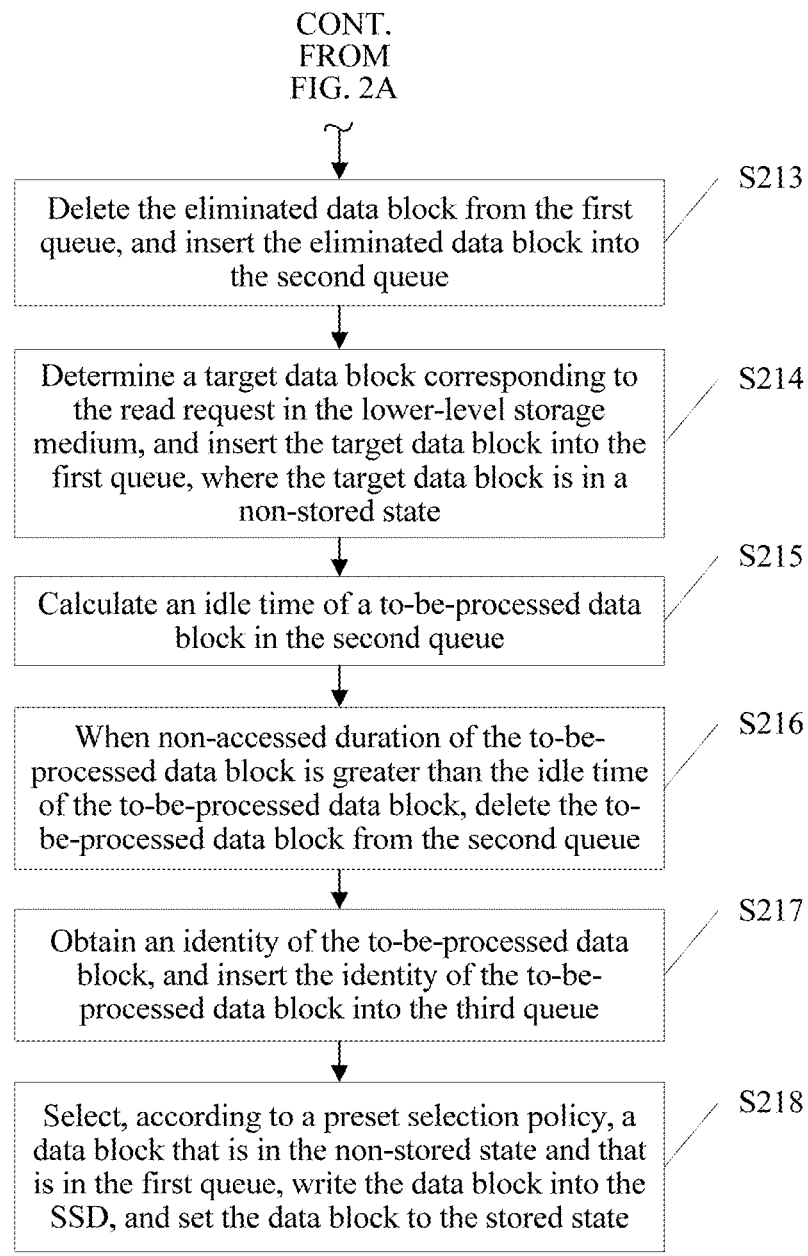

Referring to FIG. 2A to FIG. 2B, FIG. 2A to FIG. 2B are a schematic flowchart of a read cache management method based on an SSD according to an embodiment of the present disclosure. In this embodiment of the present disclosure, the method includes the following steps S201. Receive a read request.

S202. Determine whether a first queue is hit. If the first queue is hit, perform S202; or if the first queue is missed, perform S203.

S203. Determine whether a second queue is hit. If the second queue is hit, perform S207; or if the second queue is missed, perform S210.

S204. Determine whether a state of a hit data block is a stored state. If the state of the hit data block is the stored state, perform S205; or if the state of the hit data block is a non-stored state, perform S206.

S205. Return data from the hit data block.

S206. Return data from a lower-level storage medium.

S207. Select one eliminated data block according to a cache replacement algorithm. The eliminated data block is selected from the first queue according to the cache replacement algorithm. The cache replacement algorithm includes an LRU, an LIRS, an ARC, or the like, and the present disclosure imposes no limitation.

S208. Delete, from the second queue, the hit data block corresponding to the read request.

S209. Insert the hit data block into the first queue.

S210. Determine whether the eliminated data block is in the stored state. If the eliminated data block is in the stored state, perform S211; or if the eliminated data block is in the non-stored state, perform S212.

S211. Determine whether an identity of the eliminated data block is in a third queue. If the identity of the eliminated data block is in the third queue, perform S212; or if the identity of the eliminated data block is not in the third queue, perform S213.

S212. Delete the eliminated data block from the first queue, and delete the eliminated data block from an SSD.

S213. Delete the eliminated data block from the first queue, and insert the eliminated data block into the second queue.

S214. Determine a target data block corresponding to the read request in the lower-level storage medium, and insert the target data block into the first queue, where the target data block is in the non-stored state.

S215. Calculate an idle time of a to-be-processed data block in the second queue.

S216. When non-accessed duration of the to-be-processed data block is greater than the idle time of the to-be-processed data block, delete the to-be-processed data block from the second queue.

S217. Obtain an identity of the to-be-processed data block, and insert the identity of the to-be-processed data block into the third queue.

S218. Select, according to a preset selection policy, a data block that is in the non-stored state and that is in the first queue, write the data block into the SSD, and set the data block to the stored state.

The first data block in the non-stored state is written into the SSD, and the data block is set to the stored state after a write operation is completed; or the first K data blocks that are in the non-stored state and that are in the first queue are determined, where K is an integer greater than 0; and a data block that has a maximum access count and that is in the K data blocks is written into the SSD, and the data block that has the maximum access count is set to the stored state after write operation is completed.

During implementation of this embodiment of the present disclosure, considering a limited erase count of an SSD, based on an existing cache replacement algorithm, a data block eliminated from a first queue is inserted into a set second queue instead of being directly deleted from the SSD, and therefore a retention time of the eliminated data block in the SSD is increased, so as to increase a read hit ratio of the SSD. In addition, when the SSD is missed, metadata is written into the first queue, so that a write count of the SSD can be reduced, and service life of the SSD can be extended.

Figure 3:
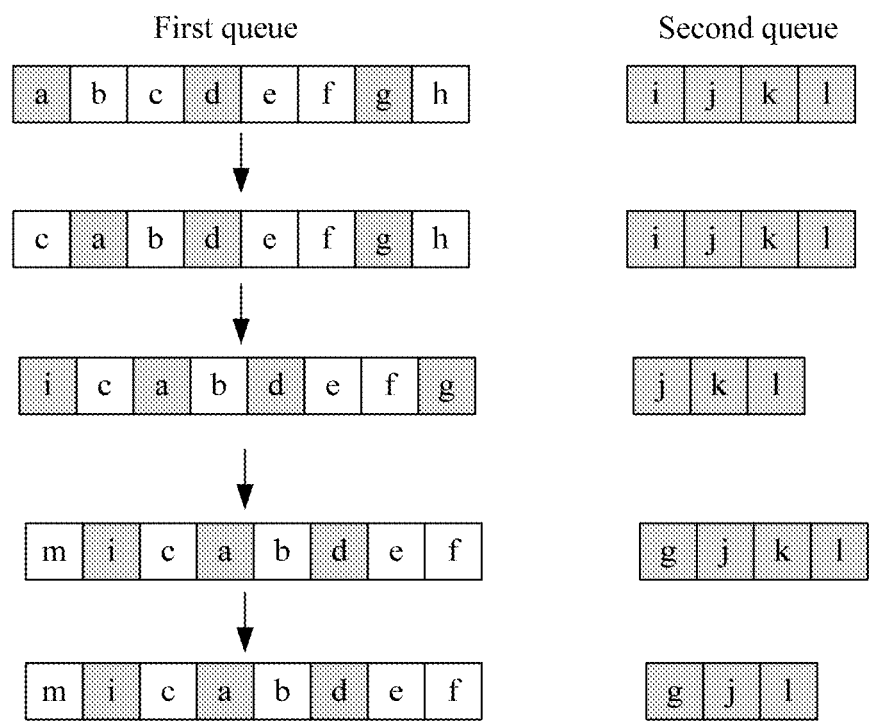
FIG. 3 is a schematic diagram of an example of a read cache management method based on an SSD according to an embodiment of the present disclosure.

Referring to FIG. 3, FIG. 3 is a schematic diagram of an example of a read cache management method based on an SSD according to an embodiment of the present disclosure. In this embodiment of the present disclosure and in an initial state, a first queue includes a data block a, a data block b, a data block c, a data block d, a data block e, a data block f, a data block g, and a data block h, where the data block a, the data block d, and the data block g are in a stored state, and the data block b, the data block c, the data block e, the data block f, and the data block h are in a non-stored state; and a second queue includes a data block i, a data block j, a data block k, and a data block 1. A cache replacement algorithm is an LRU, and when a read cache management apparatus receives a read request, a processing procedure that is performed according to a hit result of the read request is as follows:

When the read cache management apparatus first receives the read request, the read request hits the data block c in the first queue, and the data block c is in the non-stored state. The read cache management apparatus queries a data block in a lower-level storage medium according to metadata in the data block c, and performs a write operation on the queried data block according to the read request.

When the read cache management apparatus receives the read request again, the read request hits a data block i in the second queue. The data block i is deleted from the second queue, and the first queue is a full queue. The read cache management apparatus determines an eliminated data block in the first queue according to the LRU algorithm. The eliminated data block in FIG. 3 is the data block h, and the data block h is in the non-stored state. The read cache management apparatus directly deletes the data block h from the first queue and the SSD. After a deletion operation, there is an idle position in the first queue, and the read cache management apparatus inserts the data block i into the first queue.

When the read cache management apparatus receives the read request for the third time, the read request misses the first queue or the second queue. The read cache management apparatus determines an eliminated data block in the first queue according to the LRU algorithm, and the eliminated data block is the data block g. The read cache management apparatus deletes the data block g from the first queue, and inserts the data block g into the second queue. After the data block g is deleted, the read cache management apparatus inserts a data block m into the first queue. The data block m is a target data block corresponding to the read request, and the data block m is in the non-stored state.

When a data block is eliminated from the second queue, the read cache management apparatus writes the data block into the first queue according to a cache update policy, for example, the first data block m that is in the non-stored state and that is in the first queue is written into the SSD.

Figure 4:
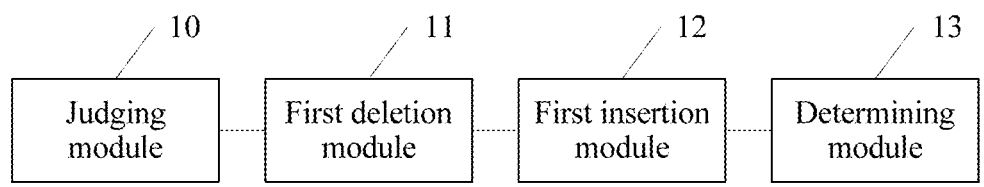
FIG. 4 is a schematic structural diagram of a read cache management apparatus based on an SSD according to an embodiment of the present disclosure.

Referring to FIG. 4, FIG. 4 is a schematic structural diagram of a read cache management apparatus based on an SSD according to an embodiment of the present disclosure, which is configured to implement a read cache management method based on the SSD in this embodiment of the present disclosure. In this embodiment of the present disclosure, the apparatus includes a judging module 10, a first deletion module 11, a first insertion module 12, and a determining module 13.

The judging module 10 is configured to: receive a read request, and determine whether the read request hits the first queue and the second queue.

The first deletion module 11 is configured to: if both the first queue and the second queue are missed, select and delete an eliminated data block from the first queue according to a cache replacement algorithm.

The first insertion module 12 is configured to: if the eliminated data block is in a stored state, insert the eliminated data block into the second queue.

The determining module 13 is configured to: determine a target data block corresponding to the read request in a lower-level storage medium, and insert the target data block into the first queue, where the target data block is in a non-stored state.

During implementation of this embodiment of the present disclosure, considering a limited erase count of an SSD, based on an existing cache replacement algorithm, a data block eliminated from a first queue is inserted into a set second queue instead of being directly deleted from the SSD, and therefore a retention time of the eliminated data block in the SSD is increased, so as to increase a read hit ratio of the SSD. In addition, when the SSD is missed, metadata is written into the first queue, so that a write count of the SSD can be reduced, and service life of the SSD can be extended.

Further, in some embodiments of the present disclosure, the read cache management apparatus further includes a second deletion module 14, configured to: if the eliminated data block is in the non-stored state, delete the eliminated data block from the first queue, and delete the eliminated data block from the SSD.

Optionally, in some embodiments of the present disclosure, the read cache management apparatus further includes a third deletion module 15 and a second insertion module 16.

The third deletion module 15 is configured to: if the read request misses the first queue, but hits the second queue, delete, from the second queue, a hit data block corresponding to the read request.

The second insertion module 16 is configured to insert the hit data block into the first queue.

Optionally, in some embodiments of the present disclosure, the read cache management apparatus further includes a calculation module 17, a fourth deletion module 18, and a third insertion module 19.

The calculation module 17 is configured to calculate an idle time of a to-be-processed data block in the second queue, where the to-be-processed data block is any one of data blocks in the second queue.

The fourth deletion module 18 is configured to: when non-accessed duration of the to-be-processed data block is greater than the idle time of the to-be-processed data block, delete the to-be-processed data block from the second queue.

The third insertion module 19 is configured to: obtain an identity of the to-be-processed data block, and insert the identity of the to-be-processed data block into a third queue.

Optionally, in some embodiments of the present disclosure, the calculation module 17 includes a statistics collecting unit 171 and a calculation unit 172.

The statistics collecting unit 171 is configured to collect statistics on hit count M of the to-be-processed data block in the first queue and hit count N of the to-be-processed data block in the second queue.

The calculation unit 172 is configured to calculate the idle time of the to-be-processed data block according to the hit count M and the hit count N.

Optionally, in some embodiments of the present disclosure, the first insertion module is configured to: obtain identity information of the eliminated data block; and if the identity information of the eliminated data block is not in a third queue, insert the eliminated data block into the second queue; or if the identity information of the eliminated data block is in the third queue, determine whether elimination duration of the eliminated data block is greater than a preset time threshold; and if the elimination duration of the eliminated data block is greater than the preset time threshold, insert the eliminated data block into the second queue.

Optionally, in some embodiments of the present disclosure, the read cache management apparatus further includes a write module 20.

The write module 20 is configured to: search the first queue for the first data block in the non-stored state; and write the first data block in the non-stored state into the SSD, and set the data block to the stored state after a write operation is completed; or determine the first K data blocks that are in the non-stored state and that are in the first queue, where K is an integer greater than 0; and write a data block that has a maximum access count and that is in the K data blocks into the SSD, and set the data block that has the maximum access count to the stored state after write operation is completed.

This embodiment of the present disclosure and the method Embodiment 1 are based on a same conception, and a technical effect brought by this embodiment of the present disclosure is also the same. For a detailed process, refer to description of the method Embodiment 1. Details are not described herein.

Figure 5:
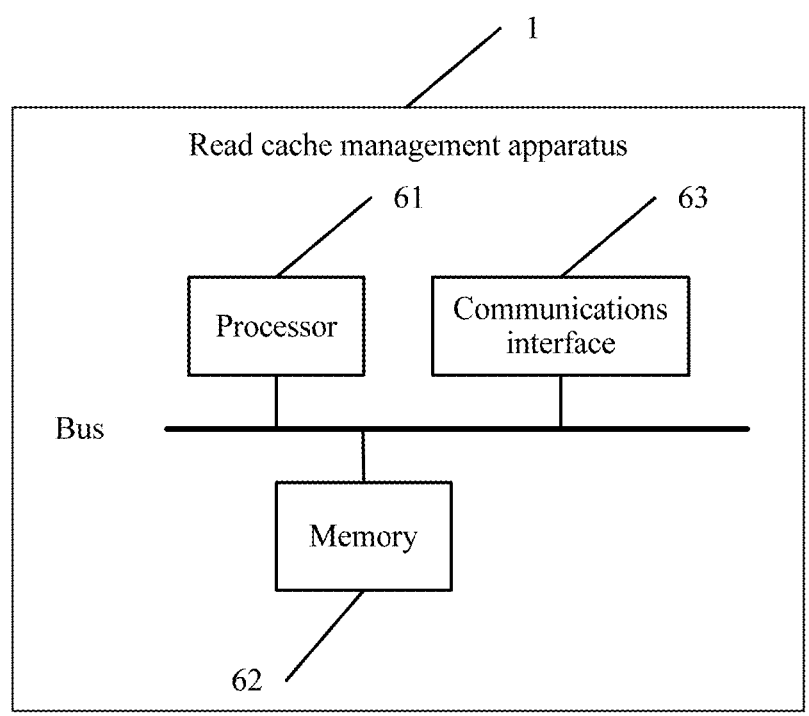
FIG. 5 is another schematic structural diagram of a read cache management apparatus based on an SSD according to an embodiment of the present disclosure.

Referring to FIG. 5, FIG. 5 is another schematic structural diagram of a read cache management apparatus based on an SSD according to an embodiment of the present disclosure, which is configured to implement a read cache management method based on the SSD in this embodiment of the present disclosure. The read cache management apparatus 1 includes a processor 61, a memory 62, and a communications interface 63. There may be one or more processors 61 in the read cache management apparatus 1, and one processor is used as an example in FIG. 5. In some embodiments of the present disclosure, the processor 61, the memory 62, and the communications interface 63 may be connected by using a bus or in another manner. A bus connection is used as an example in FIG. 5.

The memory 62 stores a set of program code, and the processor 61 is configured to invoke the program code stored in the memory 62, so as to perform the following operations:

receiving a read request, and determining whether the read request hits the first queue and the second queue;

if both the first queue and the second queue are missed, selecting and deleting an eliminated data block from the first queue according to a cache replacement algorithm;

if the eliminated data block is in a stored state, inserting the eliminated data block into the second queue; and determining a target data block corresponding to the read request in a lower-level storage medium, and inserting the target data block into the first queue, where the target data block is in a non-stored state.

Further, in some embodiments of the present disclosure, the processor 61 is further configured to perform the following operation:

if the eliminated data block is in the non-stored state, deleting the eliminated data block from the first queue, and deleting the eliminated data block from the SSD.

In some embodiments of the present disclosure, the processor 61 is further configured to perform the following operations:

if the read request misses the first queue, but hits the second queue, deleting, from the second queue, a hit data block corresponding to the read request; and inserting the hit data block into the first queue.

In some embodiments of the present disclosure, the processor 61 is further configured to perform the following operations:

calculating an idle time of a to-be-processed data block in the second queue, where the to-be-processed data block is any one of data blocks in the second queue;

when non-accessed duration of the to-be-processed data block is greater than the idle time of the to-be-processed data block, deleting the to-be-processed data block from the second queue; and obtaining an identity of the to-be-processed data block, and inserting the identity of the to-be-processed data block into a third queue.

In some embodiments of the present disclosure, that the processor 61 performs an operation of calculating the idle time of the to-be-processed data block in the second queue includes:

collecting statistics on hit count M of the to-be-processed data block in the first queue and hit count N of the to-be-processed data block in the second queue; and calculating the idle time of the to-be-processed data block according to the hit count M and the hit count N.

In some embodiments of the present disclosure, that the processor 61 performs an operation of inserting the eliminated data block into the second queue includes:

obtaining identity information of the eliminated data block; and if the identity information of the eliminated data block is not in a third queue, inserting the eliminated data block into the second queue; or if the identity information of the eliminated data block is in the third queue, determining whether elimination duration of the eliminated data block is greater than a preset time threshold; and if the elimination duration of the eliminated data block is greater than the preset time threshold, inserting the eliminated data block into the second queue.

In some embodiments of the present disclosure, the processor 61 is further configured to perform the following operations:

searching the first queue for the first data block in the non-stored state; and writing the first data block in the non-stored state into the SSD, and setting the data block to the stored state after a write operation is completed; or determining the first K data blocks that are in the non-stored state and that are in the first queue, where K is an integer greater than 0; and writing a data block that has a maximum access count and that is in the K data blocks into the SSD, and setting the data block that has the maximum access count to the stored state after a write operation is completed.

During implementation of this embodiment of the present disclosure, considering a limited erase count of an SSD, based on an existing cache replacement algorithm, a data block eliminated from a first queue is inserted into a set second queue instead of being directly deleted from the SSD, and therefore a retention time of the eliminated data block in the SSD is increased, so as to increase a read hit ratio of the SSD. In addition, when the SSD is missed, metadata is written into the first queue, so that a write count of the SSD can be reduced, and service life of the SSD can be extended.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely exemplary embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A read cache management method based on a solid state drive, wherein the solid state drive (SSD) comprises a first queue and a second queue, and the method comprises:
   receiving a read request, and determining whether the read request hits the first queue and the second queue;
   if both the first queue and the second queue are missed, selecting and deleting an eliminated data block from the first queue according to a cache replacement algorithm;
   if the eliminated data block is in a stored state, inserting the eliminated data block into the second queue; and
   determining a target data block corresponding to the read request in a lower-level storage medium, and inserting the target data block into the first queue, wherein the target data block is in a non-stored state.

2. The method according to claim 1, further comprising:
   if the eliminated data block is in the non-stored state, deleting the eliminated data block from the first queue, and deleting the eliminated data block from the SSD.

3. The method according to claim 1, further comprising:
   if the read request misses the first queue, but hits the second queue, deleting, from the second queue, a hit data block corresponding to the read request; and
   inserting the hit data block into the first queue.

4. The method according to claim 2, further comprising:
   calculating an idle time of a to-be-processed data block in the second queue, wherein the to-be-processed data block is any one of data blocks in the second queue;
   when non-accessed duration of the to-be-processed data block is greater than the idle time of the to-be-processed data block, deleting the to-be-processed data block from the second queue; and
   obtaining an identity of the to-be-processed data block, and inserting the identity of the to-be-processed data block into a third queue.

5. The method according to claim 4, wherein the calculating an idle time of a to-be-processed data block in the second queue comprises:
   collecting statistics on hit count M of the to-be-processed data block in the first queue and hit count N of the to-be-processed data block in the second queue, wherein M and N are integers greater than 0; and
   calculating the idle time of the to-be-processed data block according to the hit count M and the hit count N.

6. The method according to claim 3, wherein the inserting the eliminated data block into the second queue comprises:
   obtaining identity information of the eliminated data block; and
   if the identity information of the eliminated data block is not in a third queue, inserting the eliminated data block into the second queue; or
   if the identity information of the eliminated data block is in the third queue, determining whether elimination duration of the eliminated data block is greater than a preset time threshold; and if the elimination duration of the eliminated data block is greater than the preset time threshold, inserting the eliminated data block into the second queue.

7. The method according to claim 1, wherein after the deleting the to-be-processed data block from the second queue when non-accessed duration of the to-be-processed data block is greater than the idle time of the to-be-processed data block, the method further comprises:
   searching the first queue for the first data block in the non-stored state; and
   writing the first data block in the non-stored state into the SSD, and setting the data block to the stored state after a write operation is completed; or
   determining the first K data blocks that are in the non-stored state and that are in the first queue, wherein K is an integer greater than 0; and
   writing a data block that has a maximum access count and that is in the K data blocks into the SSD, and setting the data block that has the maximum access count to the stored state after a write operation is completed.

8. A read cache management apparatus based on a solid state drive, wherein the SSD comprises a first queue and a second queue, and the apparatus comprises:
   a processor and a non-transitory computer-readable medium having processor-executable instructions stored thereon, wherein the processor-executable instructions, when executed by the processor, facilitate performance of the following:
   receive a read request, and determine whether the read request hits the first queue and the second queue;
   if both the first queue and the second queue are missed, select and delete an eliminated data block from the first queue according to a cache replacement algorithm;
   if the eliminated data block is in a stored state, insert the eliminated data block into the second queue; and
   determine a target data block corresponding to the read request in a lower-level storage medium, and insert the target data block into the first queue, wherein the target data block is in a non-stored state.

9. The apparatus according to claim 8, wherein the processor-executable instructions, when executed, are further configured to facilitate:
   if the eliminated data block is in the non-stored state, delete the eliminated data block from the first queue, and delete the eliminated data block from the SSD.

10. The apparatus according to claim 9, wherein the processor-executable instructions, when executed, are further configured to facilitate:
    if the read request misses the first queue, but hits the second queue, delete, from the second queue, a hit data block corresponding to the read request; and
    insert the hit data block into the first queue.

11. The apparatus according to claim 9, wherein the processor-executable instructions, when executed, are further configured to facilitate:
    calculate an idle time of a to-be-processed data block in the second queue, wherein the to-be-processed data block is any one of data blocks in the second queue;
    when non-accessed duration of the to-be-processed data block is greater than the idle time of the to-be-processed data block, delete the to-be-processed data block from the second queue; and
    obtain an identity of the to-be-processed data block, and insert the identity of the to-be-processed data block into a third queue.

12. The apparatus according to claim 11, wherein the processor-executable instructions, when executed, are configured to facilitate:
    a statistics collecting unit, configured to collect statistics on hit count M of the to-be-processed data block in the first queue and hit count N of the to-be-processed data block in the second queue, wherein M and N are integers greater than 0; and
    a calculation unit, configured to calculate the idle time of the to-be-processed data block according to the hit count M and the hit count N.

13. The apparatus according to claim 10, wherein the processor-executable instructions, when executed, are configured to facilitate:
    obtain identity information of the eliminated data block; and
    if the identity information of the eliminated data block is not in a third queue, insert the eliminated data block into the second queue; or
    if the identity information of the eliminated data block is in the third queue, determine whether elimination duration of the eliminated data block is greater than a preset time threshold; and if the elimination duration of the eliminated data block is greater than the preset time threshold, insert the eliminated data block into the second queue.

14. The apparatus according to claim 8, wherein the processor-executable instructions, when executed, are further configured to facilitate:
    search the first queue for the first data block in the non-stored state; and
    write the first data block in the non-stored state into the SSD, and set the data block to the stored state after a write operation is completed; or
    determine the first K data blocks that are in the non-stored state and that are in the first queue, wherein K is an integer greater than 0; and
    write a data block that has a maximum access count and that is in the K data blocks into the SSD, and set the data block that has the maximum access count to the stored state after write operation is completed.

* * * * *